United States Patent [19]

Neri

[11] Patent Number: 4,764,078
[45] Date of Patent: Aug. 16, 1988

[54] AUTOMATED SYSTEM FOR FEEDING PRODUCTION AND/OR PACKING MATERIAL FROM A STORE ONTO MANUFACTURING LINES

[75] Inventor: Armando Neri, Bologna, Italy

[73] Assignee: G. D. Societa' per Azioni, Bologna, Italy

[21] Appl. No.: 860,079

[22] Filed: May 6, 1986

[30] Foreign Application Priority Data

May 10, 1985 [IT] Italy ................................. 3431 A/85

[51] Int. Cl.$^4$ ............................................ B65G 65/00
[52] U.S. Cl. .................................. 414/273; 180/14.3; 180/65.1; 180/168; 414/225; 414/279; 414/352; 901/1; 901/6; 901/13
[58] Field of Search ............... 414/225, 226, 267, 273, 414/279, 280, 339, 345, 352, 392, 398, 399, 402; 901/1, 6, 7, 8, 11, 13; 180/168, 14.3, 65.1; 105/50, 51

[56] References Cited

U.S. PATENT DOCUMENTS

| 408,231 | 8/1889 | Griscom ................................. 105/51 |
| 2,988,237 | 6/1961 | Devol, Jr. ............................ 901/7 X |
| 3,272,347 | 9/1966 | Lemelson ............................. 414/728 |
| 3,376,988 | 4/1968 | Klosk .................................... 414/498 |
| 3,709,379 | 1/1973 | Kaufeldt ............................ 901/13 X |
| 3,760,956 | 9/1973 | Burch .................................. 901/7 X |
| 3,796,327 | 3/1974 | Meyer et al. .................... 414/273 X |
| 4,137,984 | 2/1979 | Jennings et al. ................. 414/279 X |
| 4,283,165 | 8/1981 | Vertut ................................. 901/1 X |
| 4,538,950 | 9/1985 | Shiomi et al. .................... 414/392 X |
| 4,664,590 | 5/1987 | Maekawa ........................ 414/279 X |
| 4,679,149 | 7/1987 | Merz ................................. 414/273 X |

FOREIGN PATENT DOCUMENTS

| 231932 | 1/1986 | German Democratic Rep. .... 901/1 |
| 195006 | 11/1982 | Japan ................................. 414/280 |

Primary Examiner—Robert J. Spar
Assistant Examiner—Stuart J. Millman
Attorney, Agent, or Firm—Gifford, Groh, VanOphem, Sheridan, Sprinkle and Dolgorukov

[57] ABSTRACT

A system for feeding production and/or packing material onto manufacturing lines, which system has compartment for storing the material; guide tapes for mobile trucks traveling between a storage area and manufacturing lines. The guide tapes define routes selectively traveled along, in use, by the mobile trucks for transporting and feeding the material to the manufacturing lines. A computer controls the position and operation of the mobile trucks; and a number of mobile trucks having an independent electricity supply and designed to supply operating-arm units are connected at least temporarily to the mobile trucks.

10 Claims, 3 Drawing Sheets

4,764,078

AUTOMATED SYSTEM FOR FEEDING PRODUCTION AND/OR PACKING MATERIAL FROM A STORE ONTO MANUFACTURING LINES

BACKGROUND OF THE INVENTION

The present invention relates to an automated system for feeding production and/or packing material from a store onto manufacturing lines.

In particular, the present invention relates to an automated system for feeding wrapping material (reels of paper and/or transparent material or stacks of preformed cardboard) onto manufacturing and/or packing lines (conveniently cigarette manufacturing and packing lines).

Manufacturing lines are known to comprise a number of operating machines, at least some of which must be supplied periodically with production and/or packing material for the products manufactured on the line. As providing a specific store for each operating machine involves a number of drawbacks, e.g. cluttering up the area in the vicinity of the machine, hindering supply to the various machine stores and, in the event of supply from each store to the respective machine being automated, considerable installation cost due to each machine having its own automatic loading system, a number of automated systems have been proposed for feeding the said production and/or packing material onto the said manufacturing lines.

Such systems, however, may involve a number of drawbacks in terms of supply capacity and flexibility, particularly in cases where the line is supplied with a fairly wide range of materials, or when the storage area is located a fairly long distance, e.g. even as far as a kilometer, from the manufacturing line area.

SUMMARY OF THE INVENTION

The aim of the present invention is to provide an automated system for feeding production and/or packing material onto manufacturing lines, said system constituting an improvement to former automated supply systems and providing for overcoming the aforementioned drawbacks, while at the same time providing for major advantages in terms of fully automatic operating capacity and flexibility.

With these aims in view, according to the present invention, there is provided an automated system for feeding production and/or packing material onto manufacturing lines, said system comprising means for storing the said material; guide means for mobile means traveling between the said store and the said manufacturing lines, the said guide means defining routes selectively traveled along, in use, by the said mobile means for transporting and feeding the said material to the said manufacturing lines; and computer means for controlling the position and operation of the said mobile means; characterised by the fact that it comprises a number of the said mobile means having an independent electricity supply and designed to supply operating-arm units connected at least temporarily to the said mobile means.

BRIEF DESCRIPTION OF THE DRAWINGS

The present invention will be described by way of example with reference to the accompanying drawings in which.

DETAILED DESCRIPTION OF THE INVENTION

Figure 1:
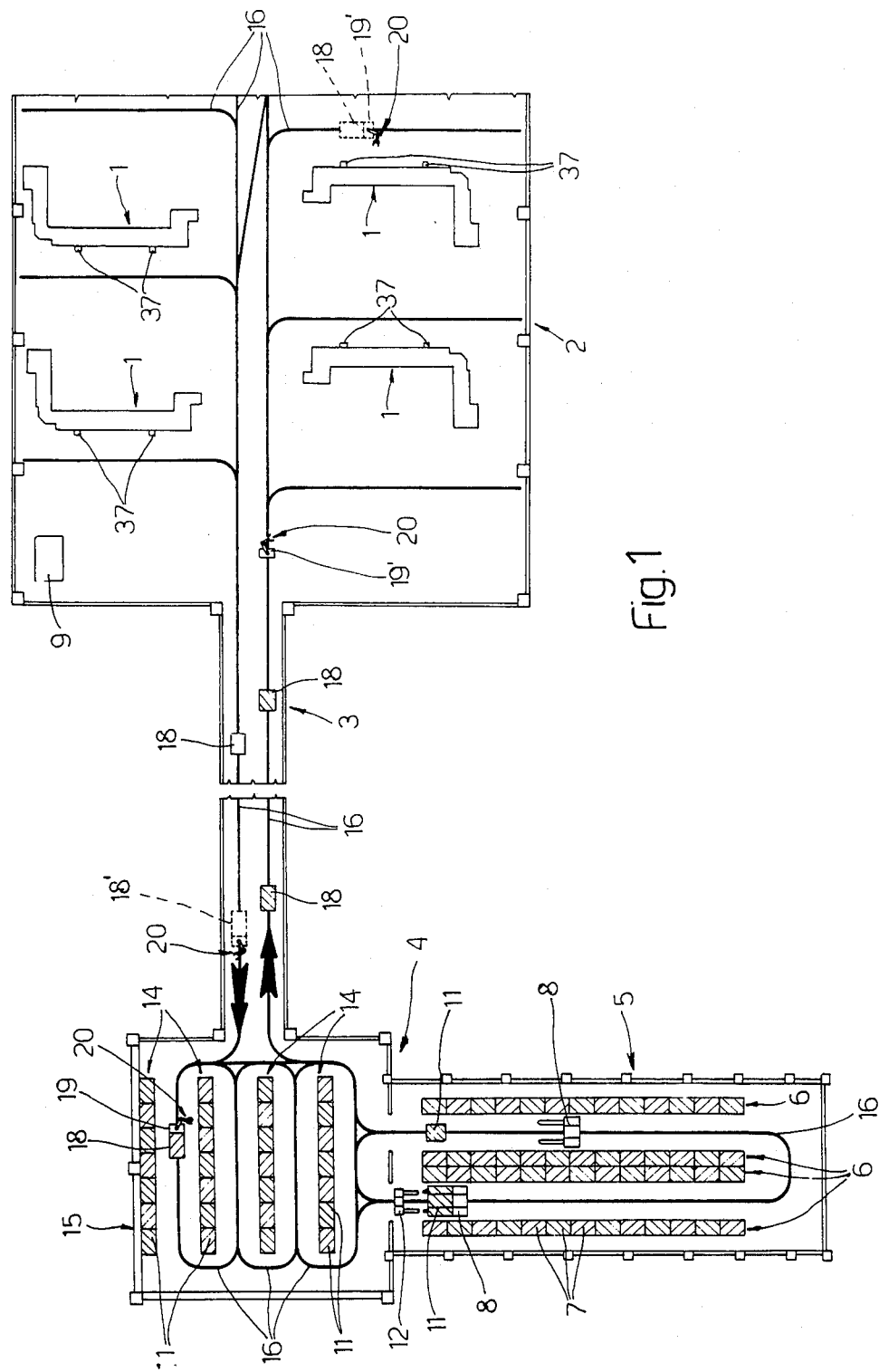
FIG. 1 shows a schematic plan view of an automated supply system according to the teachings of the present invention.

Number 1 in FIG. 1 indicates a number of manufacturing lines arranged in a manufacturing area 2 connected by way of a route 3 to a storage area 4 which may be located a relatively long distance, e.g. a few hundred meters or even a few kilometers, from manufacturing area 2.

Should the manufacturing lines 1 be cigarette manufacturing and packing lines, each manufacturing line 1 would include, in succession, a cigarette manufacturing machine, a filter assembling machine, a conveying and grouping device, and a packing machine, the output of which is connected, via a conveyor channel, to a cellophane-wrapping machine and subsequent boxing machine. The outputs of various boxing machines are connected, via conveyor channels, to a cartoning machine for forming cartons containing a number of boxes.

Each manufacturing machine must be supplied with reels of paper in which to wrap the tobacco for forming the cigarettes; each filter assembling machine must be supplied with reels of paper strips for joining the filters to the cigarettes; each packing machine must be supplied with reels of tin foil in which to pack the cigarettes, reels of printed paper labels in which to wrap the tin foil packs, and (possibly) reels of government monopoly stamps. If the packing machines are designed for manufacturing hard packs, the said label reels are replaced by reels of cardboard with which to form the collar, and stacks of preformed cardboard from which to form the hard packs. Each cellophane-wrapping machine must be supplied with reels of transparent material in which to wrap the packs, and reels of rip-off strips for tearing open the wrapping formed using the said transparent material. Each boxing machine must be supplied with stacks of preformed cardboard with which to form the boxes containing the packs, whereas each cartoning machine must be supplied with stacks of preformed cardboard.

Figure 2:
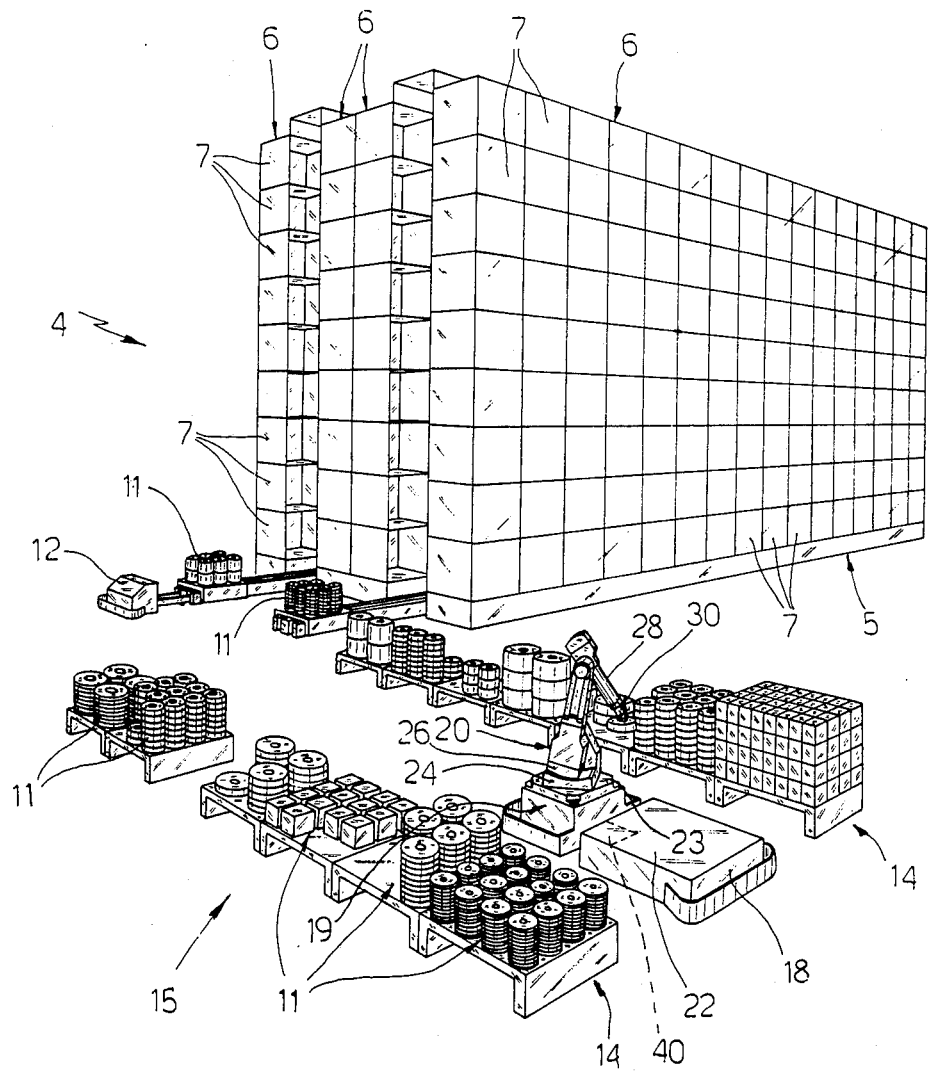
FIG. 2 shows a view in perspective of the store on the automated system shown in FIG. 1.

As shown more clearly in FIG. 2, store 4 presents a main store area 5 consisting of a number of vertical units 6 with compartments 7, each compartment 7 containing a respective type of wrapping material for a respective machine on manufacturing line 1, as already described.

As shown in FIG. 1, automatic pick-up units 8 travel between units 6 along horizontal and vertical cartesian axes and with the possibility of turning about their vertical axes. By means of control signals from computer means comprising a central processing unit 9 located in manufacturing area 2, the said units 8 automatically withdraw, from each specific compartment 7, a homogeneous group 11 of the said material, conveniently in the form of reels or stacks of preformed cardboard, which is placed outside units 6 from where it is picked up automatically by trucks 12, also controlled by central processing unit 9, which carry the groups 11, conveniently arranged on a supporting base, along rows 14 of a provisional store 15 next to main store 5.

Between rows 14 in store 15, there are provided guide means consisting of magnetic tracks 16 which, in addition to guiding trucks 12, also guide mobile means consisting of trucks 18 which are loaded, as described later on, by a mobile unit 19 with an operating arm (robot) 20, for subsequently transporting material from storage area 4 to manufacturing area 2 along route 3.

The said mobile unit 19 moves permanently within the confines of provisional store 15 and may be connected automatically to truck 18 by which it is supplied electrically.

Figure 3:
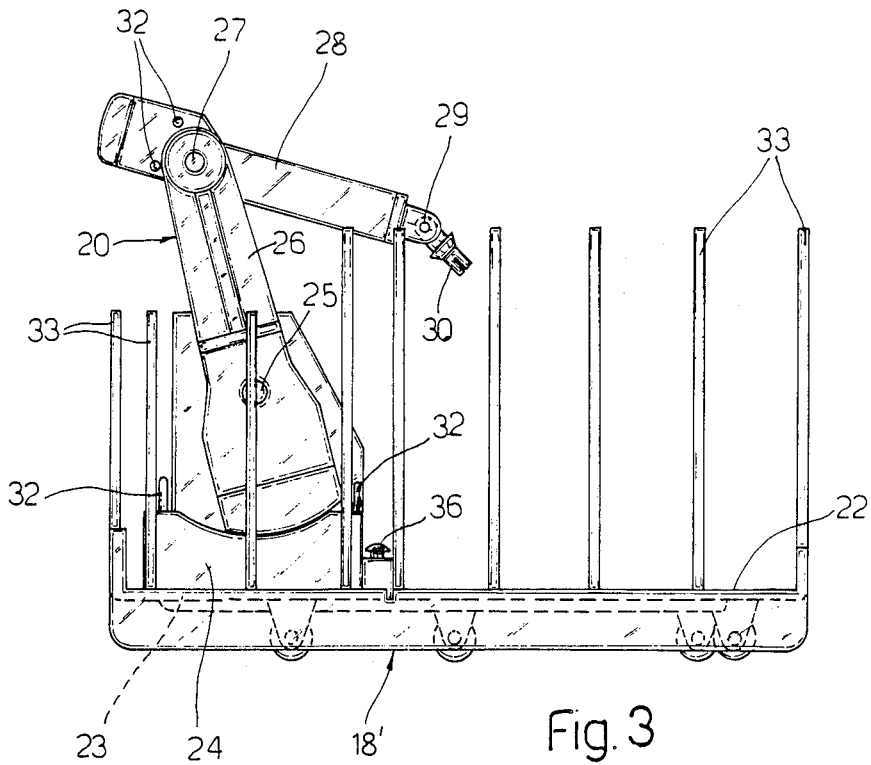
FIGS. 3 and 4 show side and plan views respectively of a material transport truck connected to an operating-arm unit employed on the automated supply system shown in FIG. 1.
Figure 4:
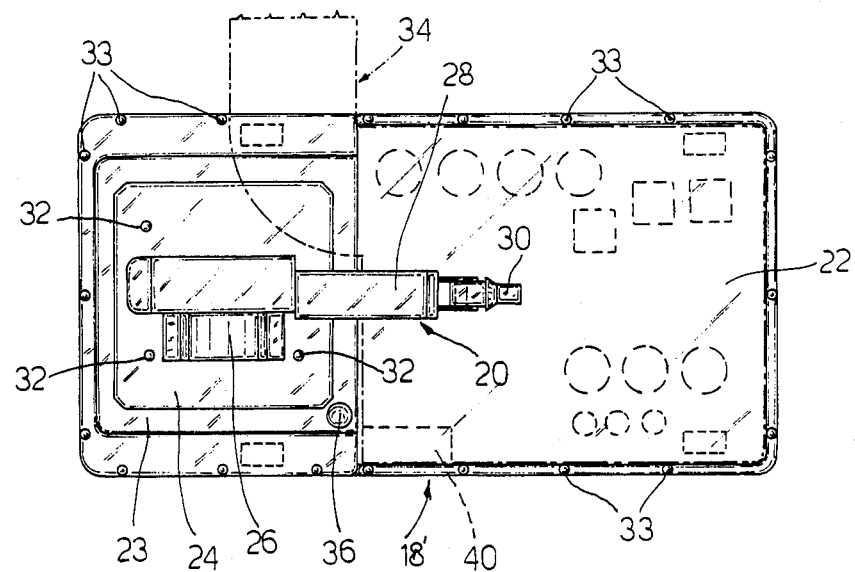

As shown in FIG. 1, manufacturing area 2 is also provided with magnetic tracks 16 defining routes towards the various manufacturing lines 1, for selective routing of trucks 18. In the said manufacturing area 2, there also travels, permanently within the confines of area 2, a mobile operating-arm unit 19' similar to mobile unit 19 in store 15. If route 3 is not very long, the said number of trucks 18 may be replaced by a truck 18' (FIGS. 3 and 4) which, in addition to presenting a loading platform 22, is fitted permanently with an operating arm 20 which, as shown in FIGS. 3 and 4, presents, in known manner, a base platform 23 on which may rotate, about the vertical axis, a turret 24, the said turret 24 being fitted, about a horizontal shaft 25, with a first mobile arm 26 fitted, by means of shaft 27 at its top end, with a second mobile arm 28 having on the end, connected by means of a horizontal shaft 29, an operating head 30 conveniently provided with known gripping means.

Truck 18' is fitted with safety limit means defining the permitted operating range of operating arm 20. In more detail, the said safety means consist of microswitches 32 appropriately arranged on turret 24 and mobile arm 28. Furthermore, the perimeter of truck 18' is fitted with vertical rods 33 which are also conveniently provided with microswitches and which, if struck by operating arm 20, cause the said operating arm 20 to be brought to a safety stop.

In like manner, when loading and unloading material on and off loading platform 22 and later onto manufacturing lines 1, operating head 30 on arm 20 is only allowed to move within the confines of loading platform 22, and within the confines of an outwardly-projecting channel 34 (dotted line in FIG. 4) defined by the location of the said microswitches. For further improving the operating safety of arm 20, platform 23 is fitted with a switch 36 which, for enabling displacement of truck 18', must be held down by operating head 30 on arm 20, thus ensuring that, during displacement of truck 18', operating arm 20 is in the withdrawn position.

Truck 18' (and also truck 18) is provided with an independent electricity supply consisting of a supply battery 40 which also supplies the motors powering operating arm 20.

Central processing and control unit 9, which comprises ROM and RAM memories, controls automatic withdrawal, by means of pick-up units 8, of various types of material (various types of reels and stacks of preformed cardboard) from the various compartments 7 on vertical units 6 of main store 5, which materials are arranged at the input of store 5 in homogeneous groups 11 and, by means of automatic control unit 9 and trucks 12, are arranged in rows 14 of provisional store 15.

When a truck 18 moves into provisional store 15, it is guided along tracks 16 by central processing unit 9 and hooked up temporarily to a mobile unit 19 with an operating arm 20, said unit 19 operating permanently within store 15 and being positioned along rows 14. Operating arm 20, which is also controlled by central processing unit 9, withdraws, from the various homogeneous groups of material 11, a combination of various types of the said reels and stacks of preformed cardboard corresponding to a programmed mean total requirement of the said materials over a given period of time on manufacturing lines 1. The said materials are then loaded onto platform 22 of truck 18 by operating arm 20 which operates within safety channel 34. Once truck 18 has been loaded, it moves automatically along route 3 to manufacturing area 2 where it is automatically hooked up to mobile unit 19' operating permanently within the said area 2.

Controlled by central processing unit 9, the said truck 18, together with unit 19' and traveling along magnetic tracks 16, moves over to manufacturing line 1 requiring material supply. Subsequent to precise positioning of truck 18, for example, by means of photocell devices 37, operating arm 20 is activated for unloading off truck 18 the type of material to be supplied to line 1. The machines on the said lines 1 preferably present sensors which, in addition to activating automatic supply devices, e.g. devices for automatically replacing the run-off reel with a standby reel usually mounted on the machine itself, supply central processing unit 9 with signals indicating the supply status of the said material and subsequent replacement. Once the supply material has been fully unloaded off truck 18, the said truck 18 goes back to storage area 4. The number of trucks 18 employed is directly proportional to the length of the said route 3.

As already stated, however, in the event of a relatively short route 3, one truck 18' may be employed with a permanent operating arm 20, in which case, no provision is made for mobile units 19 and 19' operating permanently in storage area 4 and manufacturing area 2, and truck 18' is loaded by operating arm 20 in provisional storage area 15 and the whole transferred over to manufacturing area 2.

For safety reasons, during transfer of the said truck 18', operating head 30 activates switch 36 which enables activation of the motors on truck 18' and of operating arm 20.

The advantages of the automated supply system according to the present invention will be clear from the foregoing description.

In particular, it provides for eliminating a specific store for each individual machine, the only store 4 being locatable in such a manner as not to interfere with the operation of the various manufacturing lines involved. Furthermore, by virtue of providing for a main store 5 and a provisional store 15, material supply to store 5 is handled smoothly, while at the same time enabling a high degree of flexibility in the supply of material to manufacturing lines 1 according to the specific requirements of each line at all times.

Such automation and operating flexibility may be considerably heightened by adopting operating arms 20 (robots) mounted on mobile units which may be permanently or temporarily hooked up to respective trucks carrying appropriate combinations of material and by which arms 20 are supplied.

Finally, an important feature is the provision of safety devices governing all-round operation of operating arm 20.

To those skilled in the art it will be clear that changes may be made to the system as described herein without, however, departing from the scope of the present invention. For example, different arrangements may be provided for storage area 4, operating arm 20 and trucks 18 and 18'. Also, the said manufacturing lines 1 may be lines for manufacturing and/or packing products other than cigarettes.

I claim:

1. An automated system for supplying a plurality of types of different materials to at least one manufacturing line, said system comprising:
   means for storing a plurality of homogeneous units of said plurality of types of different materials in a storage area having a plurality of compartments;
   a central processing unit for controlling the operation of said automated system;
   at least one first electrically powered mobile truck having first means for supplying electricity;
   means for selectively retrieving at least one unit of said plurality of homogeneous units from said means for storing and for loading said at least one unit on said at least one first mobile truck, said means for selectively retrieving responsive to commands from said central processing unit;
   at least one second electrically powered mobile truck having second means for supplying electricity;
   means for unloading said at least one unit of said plurality of homogeneous units from said at least one first mobile truck to one of a plurality of pallets to form a provision area, said means for unloading having an operating-arm device for loading and unloading, said operating-arm device having means for electrically connecting with said first and second means for supplying electricity of said first and second mobile trucks to receive electricity for powering said operating-arm device; said means for unloading being operable to assemble a heterogeneous group of materials on each of said at least one second mobile truck from said plurality of pallets in rsponse to commands from said central processing unit;
   means for guiding said at least one first mobile truck between said storage area and said provision area;
   means for guiding and controlling said at least one second mobile truck between said provision area and said at least one manufacturing line; and
   means for offloading at least one predetermined unit of material from said heterogeneous group of materials from each of said at least one second mobile truck to said at least one manufacturing line, said means for offloading being operable in response to commands from said central processing unit.

2. A system as claimed in claim 1, wherein said means for storing comprises at least one vertical storage unit and means for traveling along at least two perpendicular cartesian axes for withdrawing said at least one unit of said plurality of homogeneous units of from said plurality of compartments.

3. A system as claimed in claim 1, characterised by the fact that the said operating-arm device is selectively coupled to a respective one of said at least one second mobile truck for transporting said heterogeneous group of materials between said provision area and said at least one manufacturing line.

4. A system as claimed in claim 1 wherein said at least one second mobile truck comprises a plurality of said second mobile trucks adapted for travel, independently of the said operating-arm device, between the said storage area and said at least one manufacturing line.

5. A system as claimed in claim 1 characterised by the fact that the said operating-arm device includes means for limiting a predetermined operating range of said operating-arm device.

6. A system as claimed in claim 5, wherein said limiting means comprise a plurality of microswitches activated upon the attainment of limit positions defined by a plurality of vertical rods positioned on a peripheral edge of said at least one second mobile truck.

7. A system as claimed in claim 1, charaterised by the fact that the distance between the said storage means and said at least one manufacturing line is relatively long.

8. A system as claimed in claim 1, wherein said heterogeneous group of material comprises a number of different types of wrapping material.

9. A system as claimed in claim 1 wherein said operating-arm device comprises a microswitch mounted on an operating head portion of said operating-arm device and means for activation of each said at least one second mobile truck mounted on each said at least one second mobile truck, said microswitch movable into and out of contact with said means for activation for preventing operation of each said at least one second mobile truck when said microswitch is out of contact with said means for activation and permitting operation of each said at least one second mobile truck when said microswitch is in contact with said means for activation.

10. A system as claimed in claim 1 wherein said means for unloading comprises a third mobile truck having said operating-arm device mounted thereto, said third mobile truck operating permanently within said storage area; and wherein said means for offloading comprises a fourth mobile truck having an operating-arm member mounted thereto, said fourth mobile truck operating in an area adjacent to said at least one manufacturing line.

* * * * *